(12) United States Patent
Ferlitsch (10) Patent No.: US 7,515,315 B2
(45) Date of Patent: Apr. 7, 2009

(54) SCAN DESCRIPTION LANGUAGE

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 922 days.

(21) Appl. No.: 10/692,458

(22) Filed: Oct. 23, 2003

(65) Prior Publication Data
US 2005/0078336 A1 Apr. 14, 2005

Related U.S. Application Data

(63) Continuation-in-part of application No. 10/685,241, filed on Oct. 14, 2003.

(51) Int. Cl.
*H04N 1/32* (2006.01)
*H04N 1/00* (2006.01)
*G06F 3/14* (2006.01)
*G06F 3/12* (2006.01)
*G06F 15/163* (2006.01)
*G06F 15/173* (2006.01)
*G06F 15/82* (2006.01)
*G06T 5/00* (2006.01)
*G06T 1/00* (2006.01)

(52) U.S. Cl. ............... 358/474; 358/1.15; 358/442; 358/407; 358/402; 358/408

(58) Field of Classification Search ............... None
See application file for complete search history.

(56) References Cited

U.S. PATENT DOCUMENTS

| 5,701,497 | A | * | 12/1997 | Yamauchi et al. ............... 704/3 |
| 5,764,866 | A | * | 6/1998 | Maniwa ................ 358/1.15 |
| 5,768,483 | A | | 6/1998 | Maniwa et al. ............ 358/1.15 |
| 6,188,807 | B1 | * | 2/2001 | Arakawa ................ 382/319 |
| 6,289,371 | B1 | * | 9/2001 | Kumpf et al. ............... 709/203 |
| 6,321,266 | B1 | | 11/2001 | Yokomizo et al. ........... 709/226 |
| 6,738,154 | B1 | * | 5/2004 | Venable ................ 358/1.15 |
| 6,804,414 | B1 | * | 10/2004 | Sakai et al. ............. 382/289 |
| 6,809,843 | B1 | * | 10/2004 | Youngers ................ 358/474 |

(Continued)

FOREIGN PATENT DOCUMENTS

JP 11275291 A * 10/1999

(Continued)

*Primary Examiner*—Twyler L Haskins
*Assistant Examiner*—Myles D Robinson
(74) *Attorney, Agent, or Firm*—Law Office of Gerald Maliszewski; Gerald Maliszewski (57) ABSTRACT

A scan description language (SDL) system and method are provided for managing a scan job. The method comprises: scanning a document at a scanning device; constructing a scan job using SDL commands; partially performing the scan job at the scanning device in response to the SDL commands; and, partially performing the scan job at a node connected to the scanning device in response to the SDL commands. The scan job can be constructed at a scanning device front panel, a connected web page, or a client connected to the scanning device. Likewise, the scan job can be initiated from a front panel of the scanning device, a connected client, or a connected web page. Further, the scan job may be partially performed a locally connected client, a network-connected client, a network-connected server, a locally connected server, another scanning device, or a telephone network-connected client.

28 Claims, 8 Drawing Sheets

U.S. PATENT DOCUMENTS

| | | | |
|---|---|---|---|
| 6,930,803 B1 * | 8/2005 | Suzuki | 358/471 |
| 7,023,573 B2 * | 4/2006 | Ohhashi et al. | 358/1.15 |
| 7,095,513 B2 * | 8/2006 | Stringham | 358/1.13 |
| 7,142,333 B2 * | 11/2006 | Struble | 358/402 |
| 7,146,411 B2 * | 12/2006 | Kizaki | 709/220 |
| 7,330,281 B2 * | 2/2008 | Ferlitsch | 358/1.13 |
| 2002/0012453 A1 | 1/2002 | Yasuhiko et al. | 382/112 |
| 2002/0114021 A1 * | 8/2002 | Lavender et al. | 358/474 |
| 2002/0154342 A1 * | 10/2002 | Haining | 358/474 |
| 2002/0161796 A1 * | 10/2002 | Sylthe | 707/500 |
| 2005/0036165 A1 * | 2/2005 | Jia et al. | 358/1.13 |
| 2005/0094162 A1 * | 5/2005 | Ferlitsch | 358/1.6 |
| 2006/0109498 A1 * | 5/2006 | Ferlitsch | 358/1.15 |
| 2006/0146372 A1 * | 7/2006 | Bair et al. | 358/403 |
| 2006/0245005 A1 * | 11/2006 | Hall et al. | 358/448 |
| 2007/0033523 A1 * | 2/2007 | Tanaka | 715/526 |
| 2008/0079286 A1 * | 4/2008 | Ferlitsch et al. | 296/186.1 |
| 2008/0079985 A1 * | 4/2008 | Ferlitsch | 358/1.15 |

FOREIGN PATENT DOCUMENTS

| | | | |
|---|---|---|---|
| JP | 2001297081 A | * | 10/2001 |
| JP | 2003244377 A | * | 8/2003 |
| JP | 2008085978 A | * | 4/2008 |

* cited by examiner

SCAN DESCRIPTION LANGUAGE

RELATED APPLICATIONS

This application is a continuation-in-part of a pending application entitled, PSEUDO PRINT JOB SYSTEM AND METHOD FOR SCAN JOB DESPOOLING, invented by Andrew Ferlitsch, Ser. No. 10/685,241 filed on Oct. 14, 2003.

BACKGROUND OF THE INVENTION

1. Field of the Invention

This invention generally relates to digital document imaging processes and, more particularly, to a system and method for managing a scan job using a scan description language (SDL).

2. Description of the Related Art

When a network scan job is spooled to local or offline storage by a multifunctional peripheral (MFP), the retrieving of the scan job from storage may not be intuitive to the user, since the scan retrieval system is independent of the pre-existing print subsystem. That is, the scanning subsystem is considered separate from the print subsystem.

Conventionally, a print subsystem is not used for despooling (requesting and/or retrieving) a network scan job from storage to the client. There is no combined scanning/printing MFP driver. Neither is there a way of sending despooling commands for a network scan job in storage via the installed printer subsystem, such as an installed printer in a MICROSOFT® (MS) printers folder.

Rather, the despooling of a network scan job from storage, to the client, must be requested through a network scan-enabled application, or requested via direct access to the MFP, using either the front panel or a device web page. Such a scan job retrieval process may include the following steps:

a. Selecting the targeted MFP by specifying the installed scanner or MFP;

b. Specifying and sending a network scan job retrieval request via the installed scanner's scan driver.

However, the selection of the targeted MFP is prone to human error, especially in networks including several MFPs. The user may incorrectly select a network address or domain name for a locally or network-installed MFP.

Figure 1A:
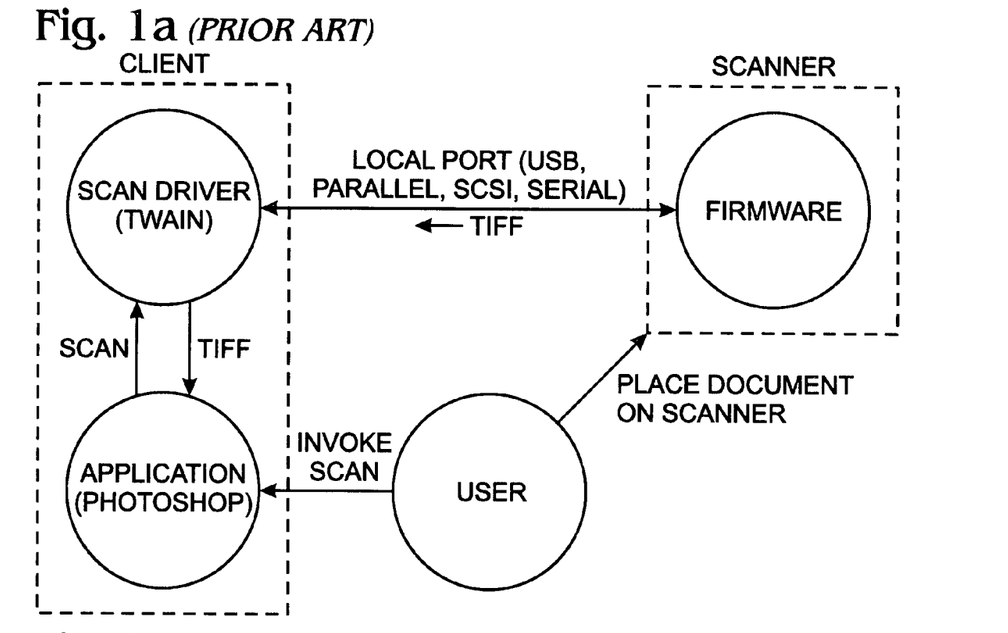
FIG. 1a is a depiction of a locally connected scanner (prior art).

FIG. 1a is a depiction of a locally connected scanner (prior art). More conventionally, scanning is usually done as a local scan job. In this case, the scanner is typically immediately adjacent to the client computing device and connected by a local port, such as a parallel, serial, SCSI, or USB port. Before scanning any jobs, the user performs a one-time installation of a compatible scanner driver, such as the Twain scan driver. To initiate a scan job, the user performs the following steps:

1. Place the documents to be scanned on the scanner;

2. Invoke a scan capable application, such as Adobe Photoshop®;

3. From the scan capable application, initiate the scan, by:

a. Selecting a File menu, followed by a Scan Menu (File->Scan);

b. Selecting the scanner driver (e.g., Twain driver); and, c. Selecting OK.

Figure 1B:
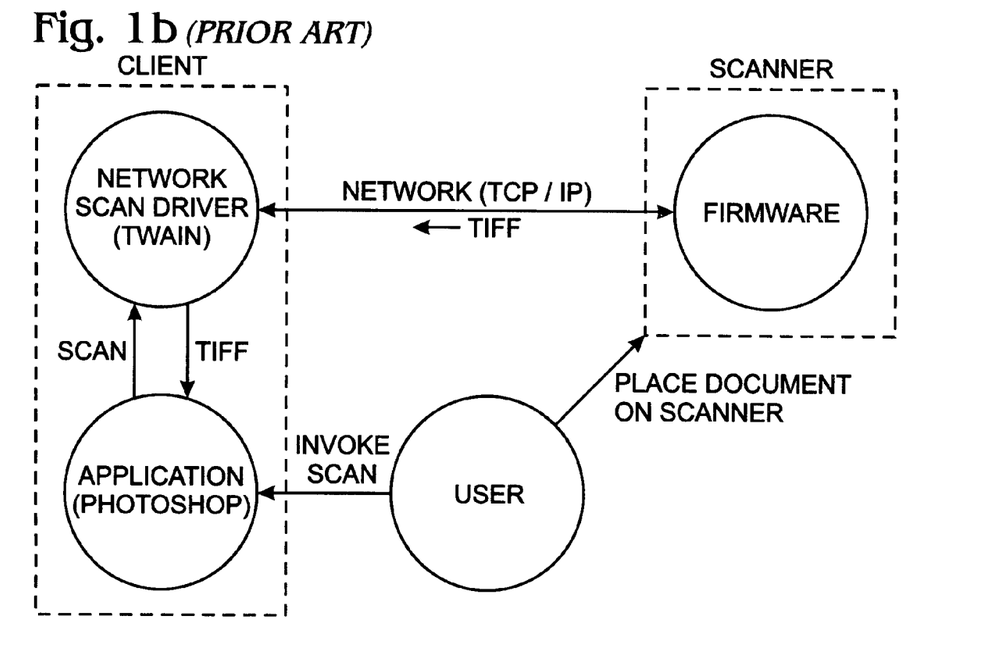
FIG. 1b is a depiction of a network-connected scanner (prior art).

FIG. 1b is a depiction of a network-connected scanner (prior art). Before scanning any jobs, the user performs a one-time installation of a compatible scanner driver, such as the Twain scan driver. To initiate a scan job, the user may perform the following steps:

1. Walk over to scanner and place documents to scan on the scanner;

2. Walk back to client computing device and invoke a scan capable application;

3. From the scan capable application, initiate the scan, by:

a. Select File->Scan;

b. Select scanner driver (e.g., Twain driver); and, c. Select OK.

4. Walk back to scanner and remove documents.

In the current art, there are several methods for scanning a scan job from a network-connected scanning device without the use of a scan driver. In these methods, the scan job is typically:

1. Invoked from the scanner.

2. Sent to a pre-specified destination profile.

3. Some transport and data protocol is used to deliver the scan job to a destination (e.g., client).

4. The scanned image is manipulated at the destination by some image manipulation-enabled application such as Adobe Photoshop.

It would be advantageous if a scan job could be performed in response to a language or set of commands developed explicitly for the control and processing of scanned documents.

It would be advantageous if the above-mentioned scan job language could enable a scan job to be performed seamlessly between different scan subsystems.

SUMMARY OF THE INVENTION

The present invention differs from the above-described scan job management approaches in that:

The construction of a scan job request, destination, scan, image manipulation, and transmission is done as a single operational step.

The specification and transmission of the scan operation steps are performed through a common mechanism and interface.

The scan operation steps are constructed from a programming language and compiled into a program unit, which can be executed in whole, or part, independently.

The program unit can be dynamically partitioned, independent of the construction of the program unit, between the MFP and the scan subsystem. That is, a first scan subsystem performs some subset of steps, deletes the executed steps, makes the appropriate subsitutions, and the remaining program unit is performed by a second scam subsystem.

Accordingly, in a network including a scanning device, a scan description language (SDL) method is provided for managing a scan job. The method comprises: scanning a document at a scanning device; constructing a scan job using SDL commands; partially performing the scan job at the scanning device in response to the SDL commands; and, partially performing the scan job at a node connected to the scanning device in response to the SDL commands.

The scan job can be constructed at a scanning device front panel, a connected web page, or a client connected to the scanning device. Likewise, the scan job can be initiated from a front panel of the scanning device, a connected client, or a connected web page. Further, the scan job may be partially performed at a locally connected client, a network-connected client, a network-connected server, a locally connected server, another scanning device, or a telephone network-connected client.

In some aspects, the method further comprises: selecting scan options such as resolution (dpi), cropping, output format, destination, compression method, encryption method, access control, or job scheduling; selecting image manipulation options such as rotation, negative image, mirror image, zoom, fit-to-size, watermark, caption, metadata inclusion, or color adjustment; and, selecting segmentation options such as optical character recognition (OCR), font replacement, language translation, filtering, or vector/bitmap enhancements.

The partial performance may include initially performing a part of the scan job task at the scanning device, and subsequently performing a part of the scan job task at a node scan subsystem. Alternately, the scan job can be partially performed, initially at a node scan subsystem, and subsequently at the scanning device.

In other aspects, the method further comprises: deleting SDL commands from the scan job associated with a particular task, after the task is performed; substituting scanned document data in the scan job, following the completion of a scan job SDL command; and, inserting new SDL commands in the scan job, following the completion of a scan job SDL command.

Additional details of the above-described method, and a SDL system for managing scan jobs, are provided below.

DETAILED DESCRIPTION OF THE PREFERRED EMBODIMENTS

Figure 2A:
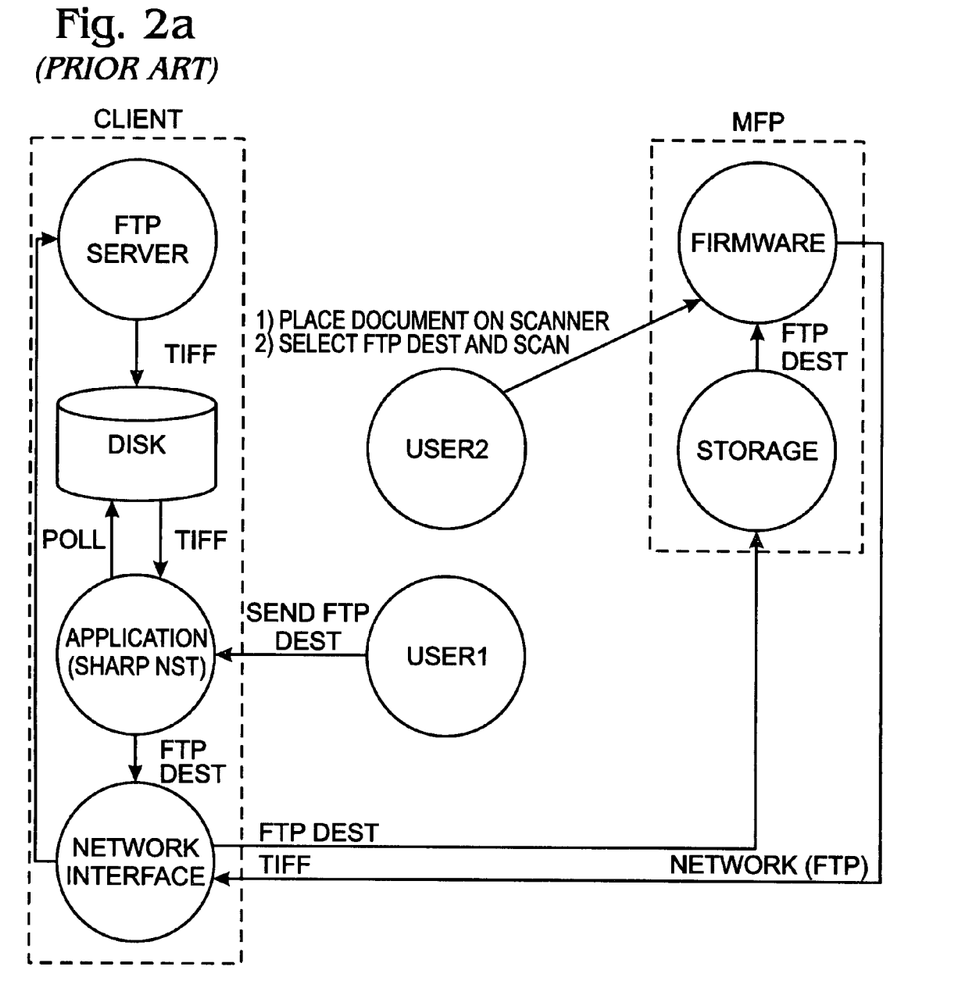
FIG. 2a is a depiction of a network-connected scanning device, without a scan driver.

FIG. 2a is a depiction of a network-connected scanning device, without a scan driver. In one method, illustrated by SHARP NST ® SHARP® Corporation, the destination profiles are setup by the user through the use of a device web page from an embedded web server in the targeted MFP, such as a SHARP® AR-275N or AR-M450 MFP. In this method, the user invokes a web browser and accesses user enters destination profiles and then saves them in the MFP's local storage. For SHARP NST®, the destination profile is the user's email address.

In this example, the user can initiate subsequent network scans by selecting the destination profile on the MFP that corresponds to their email address. The MFP then initiates the scan and sends the scan output, a TIFF document for example, as an email attachment to the corresponding email address. The user accesses the scan job by retrieving the scan job via the user's email application.

Unfortunately, the scanning operation is performed in separate unassociated steps. The user must:
  a. Load a destination profile.
  b. Initiate the scan and send to destination.
  c. Retrieve the scanned image from the destination.
  d. Manipulate the scanned image.

The specification and transmission of the scan operation steps are not performed through a common mechanism and interface. The user must separately access the embedded device web page, MFP front panel, email application, and image manipulating application. Consequentially, a respective delivery mechanism must be enabled, such as an http server, MFP firmware interface, mail server and OS applications.

There is no built-in flexibility in the partitioning of the scanning steps between the MFP, the client, and/or server computing device. The user must manually identify the capabilities of all the components and manually partition the steps between the components. For example, cropping may be performed by the MFP, and OCR performed on the client computing device.

There is no concept of a program language, where an arbitrary sequence of scanning operations, within the limitations of the MFP and scan subsystem, can be compiled, interpreted, partitioned, and executed by the MFP and scan subsystem.

Figure 2B:
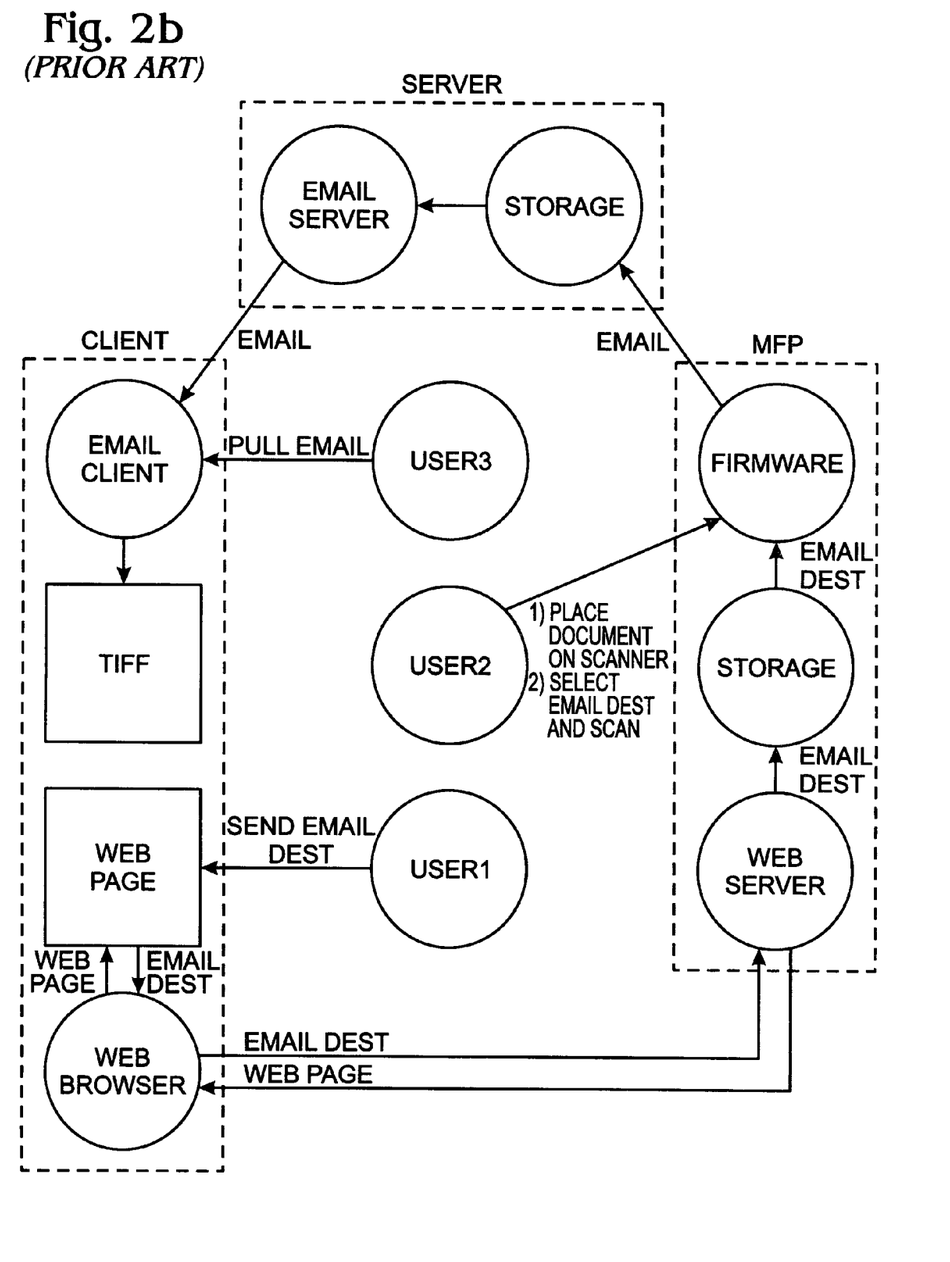
FIG. 2b is another depiction of a network-connected scanning device, without a scan driver.

FIG. 2b is another depiction of a network-connected scanning device, without a scan driver. In this method, illustrated by Sharp NST® by Sharp Corporation, the destination profiles are setup by the user on the client computing device via a network scanning-enabled application (i.e., Sharp NST®). The user invokes the network scanning application and specifies a destination profile to be sent to a targeted MFP, such as a Sharp AR-275N or AR-M450 MFP. In this case, the destination profile is a FTP server running in conjunction with the network scanning application on the client computing device. The destination profile consists of the IP address of the client computing device, the port on which the FTP server is listening, and a file system path name to where the FTP server writes the scan job (file transfer).

In this example, the user can initiate subsequent network scans by selecting the destination profile on the MFP that corresponds to their FTP server and file system path. The MFP initiates the scan and sends the scan output as a file to the specified FTP server and corresponding file system path name.

The FTP server on the client computing device receives the scan job as a file and writes the file to the corresponding file system path name. The network scanning-enabled application polls the corresponding file system path. When a file (scan job) appears in the file directory, the application recognizes the job as received and performs any operations associated with the destination. For example, an optical character recognition (OCR) process may be performed.

This method suffers with essentially the same problems as the ones confronting the system of FIG. 2a.

Figure 3:
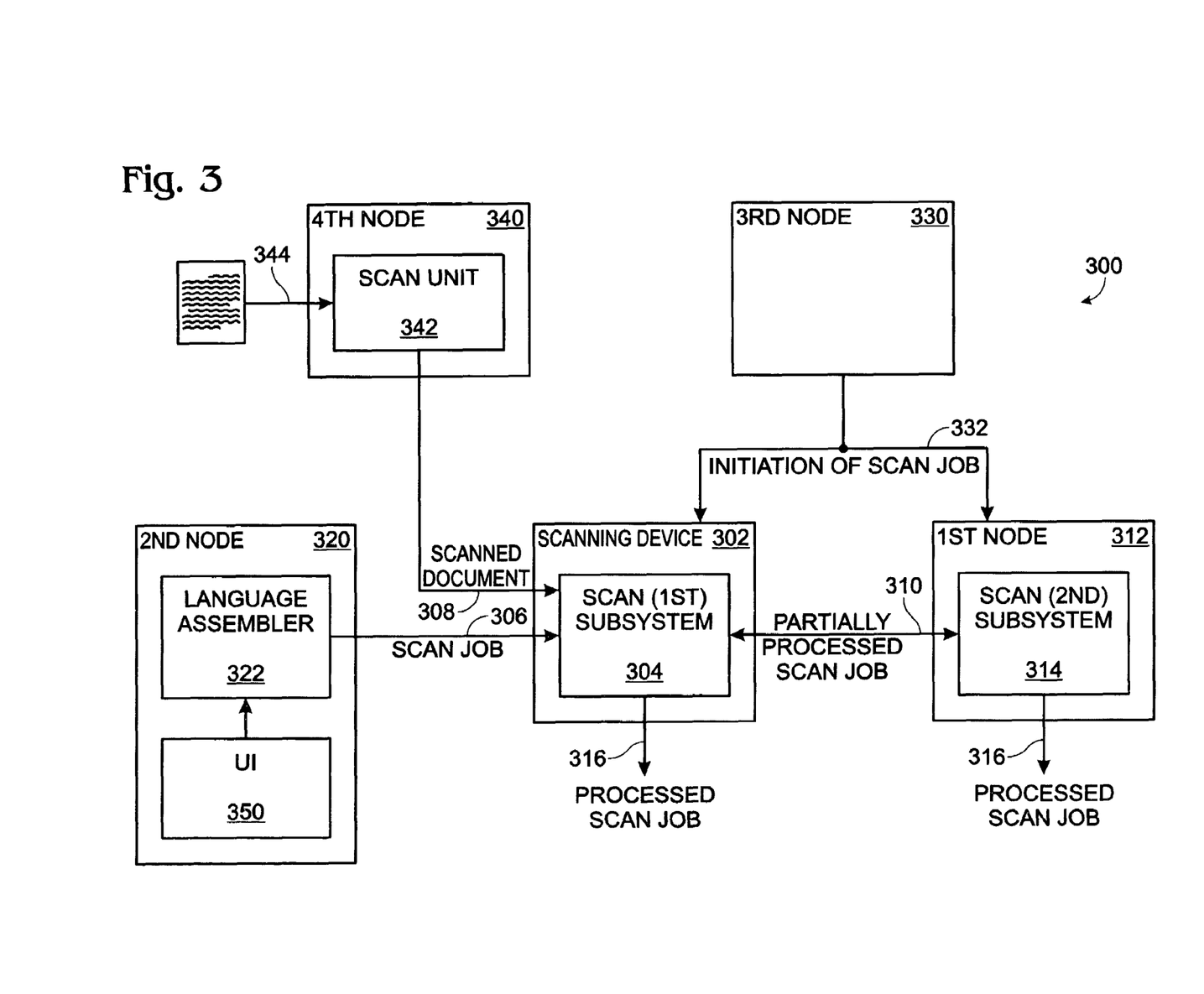
FIG. 3 is a schematic block diagram illustrating the present invention scan description language (SDL) system for managing scan jobs in a network including a scanning device.

FIG. 3 is a schematic block diagram illustrating the present invention scan description language (SDL) system for managing scan jobs in a network including a scanning device. The system 300 comprises a scanning device 302 including a first scan subsystem 304 having an interface on line 306 to accept a scan job constructed using a scan description language (SDL) commands. An interface on line 308 accepts a scanned document, and an interface on line 310 supplies at least a partially processed scan jobs in response to the SDL commands. The scanning device is typically an MFP, but can be any device capable of electronically scanning a document. As defined herein, a scan job may be the data that results from scanning a document or image. A scan job may be data that results from the generation of scanned image data from a remote location, such as a reception of a facsimile transmission. A scan job may be just the above-mentioned SDL commands. These SDL commands may be received independent of the scanned document data, or even prior to a document being scanned. In other aspects, the scan job may include both the SDL commands and the scan document data, in which case lines 306 and 308 are a common line. It should be noted that the SDL language need not conform to any particular language format.

A first node 312 is connected to the scanning device 302 on line 310. As explained in more detail below, line 310 may incorporate all, or some of lines 306 and 308. That is, the scan job and/or scanned document may be passed to the first node for an initial processing step. The first node 312 includes a second scan subsystem 314 with an interface on line 310 for accepting the SDL constructed scan job, and an interface on line 316 to supply at least a partially processed scan job in response to the SDL commands. Lines 316 may be the same line as line 310. As explained below, the scan job processing may proceed from the first node 312 to the scanning device 302. Alternately, the scanning device first scan subsystem 304 may supply a processed scan job on line 316. The first node 312 can be any one of the following devices: a locally connected client, a network-connected client, a network-connected server, a locally connected server, another scanning device, or a telephone network-connected client.

A second node 320 includes a language assembler 322 having an interface on line 306 for supplying the scan job SDL commands. Although not shown for the sake of simplicity, the second node may also be connected to the first node 312, in which case the first node 312 accepts the SDL commands from the language assembler 322. The second node 320 can be a front panel of the scanning device 302, in which case the first and third nodes are the same. The second node can also be a connected web page or a client connected to the scanning device. Thus, the first and second nodes may be the same in some aspects of the system 300.

A third node 330 has an interface on line 332 for initiating scan job processing. The third node can be connected to the second node 320, in which case the processing is initiated at the second node, or to the scanning device 302, in which case the scan job is initiated at the scanning device. The third node 330 can be a front panel of the scanning device (the first and third nodes may be the same), a connected client (the second and third nodes may be the same), or a connected web page (the second and third nodes may be the same).

A fourth node 340 has a scan unit 342 with an interface on line 344 to receive a document and an interface on line 308 to supply the scanned document. The fourth node 340 can be the scanning device 302, another scanning device connected to the scanning device 302, a fax machine, or an electronic whiteboard. The scan unit 340 is understood to include the conventional functions associated with a scanning device. In other aspects of the invention, the scanning receives an electronic document on line 344 for additional digital processing. As mentioned above, the scan unit can be a fax receiving an electronic document facsimile, or a whiteboard or electronic tablet that receives a user's handwriting as input.

The second node language assembler 322 has a user interface 350 (UI) for selecting scan options such as resolution (dpi), cropping, output format, destination, compression method, encryption method, access control, and/or job scheduling. Note, the system is not limited to merely the scan options mentioned above. Then, the second node 320 supplies scan job SDL commands to perform the selected scan options.

Likewise, the second node language assembler 322 has a UI 350 for selecting image manipulation options chosen from the group including rotation, negative image, mirror image, zoom, fit-to-size, watermark, caption, metadata inclusion, and/or color adjustment. Again, the system is not limited to the example image manipulation options. The second node 320 supplies scan job SDL commands to perform the selected image manipulation options.

The second node language assembler 322 has a UI 350 for selecting segmentation options such as optical character recognition (OCR), font replacement, language translation, filtering, and/or vector/bitmap enhancements. Again, the system is not limited to the example segmentation options. The second node supplies scan job SDL commands to perform the selected segmentation options.

In some aspects of the system 300, the scanning device first scan subsystem 304 initially performs a part of the scan job task, and the first node second scan subsystem 314 subsequently performs a part of the scan job task.

Alternately, the first node second scan subsystem 314 initially performs a part of the scan job task, prior to despooling the scan job. Then, the scanning device first scan subsystem 304 subsequently performs a part of the scan job task. Further, the first node second scan subsystem 314 may finish the scan job tasks, subsequent to the partially performing of the scan job tasks at the scanning device first scan subsystem 304. That is, the scan job need not necessarily be completed at a single scan subsystem. Rather, the scan job may be partially completed at one scan subsystem, and then passed to a different scan subsystem for additional processing tasks. It should be understood that the processing at different scan subsystems is the result of a single scan job, or a single set of SDL commands, although commends may be deleted, amended, or added in response to completing tasks. That is, the second node language assembler 322 constructs a first scan job. The scanning device first scan subsystem 304 partially performs the scan job in response to the first scan job SDL commands. Likewise, the first node second scan subsystem 314 partially performs the scan job in response to the first scan job SDL commands. In some cases, the processing tasks may be performed in a predefined order, or in a non-predefined order, or a combination of a predefined and non-predefined order.

As mentioned above, either the first scan subsystem 304 or the second scan subsystem 314, may delete SDL commands from the scan job associated with a particular task, after the task is performed. Likewise, the scan subsystems 304/314 may accept a scan job with scanned document data and substitute scanned document data in the scan job, following the completion of a SDL command. Further, the scan subsystems 304/314 may insert new SDL commands in the scan job, following the completion of a scan job SDL command.

It should be noted that any of lines 306, 308, 310, and 332 may be connected through an intervening network server (not shown).

Functional Description

Scan Job Initiated at Client Computing Device

Figure 4:
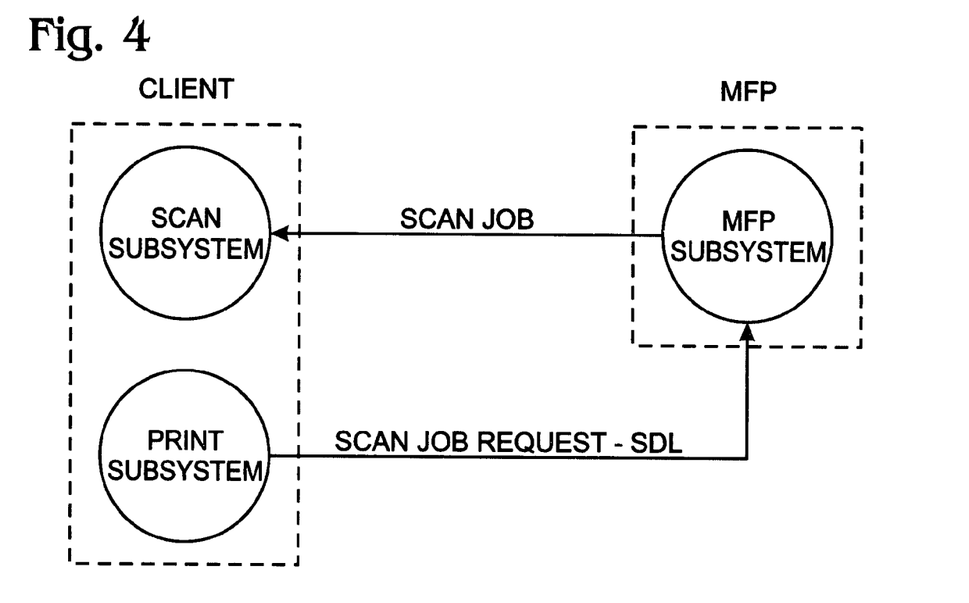
FIG. 4 illustrates a scan job request being delivered via a client print subsystem.

FIG. 4 illustrates a scan job request being delivered via a client print subsystem.

Figure 5:
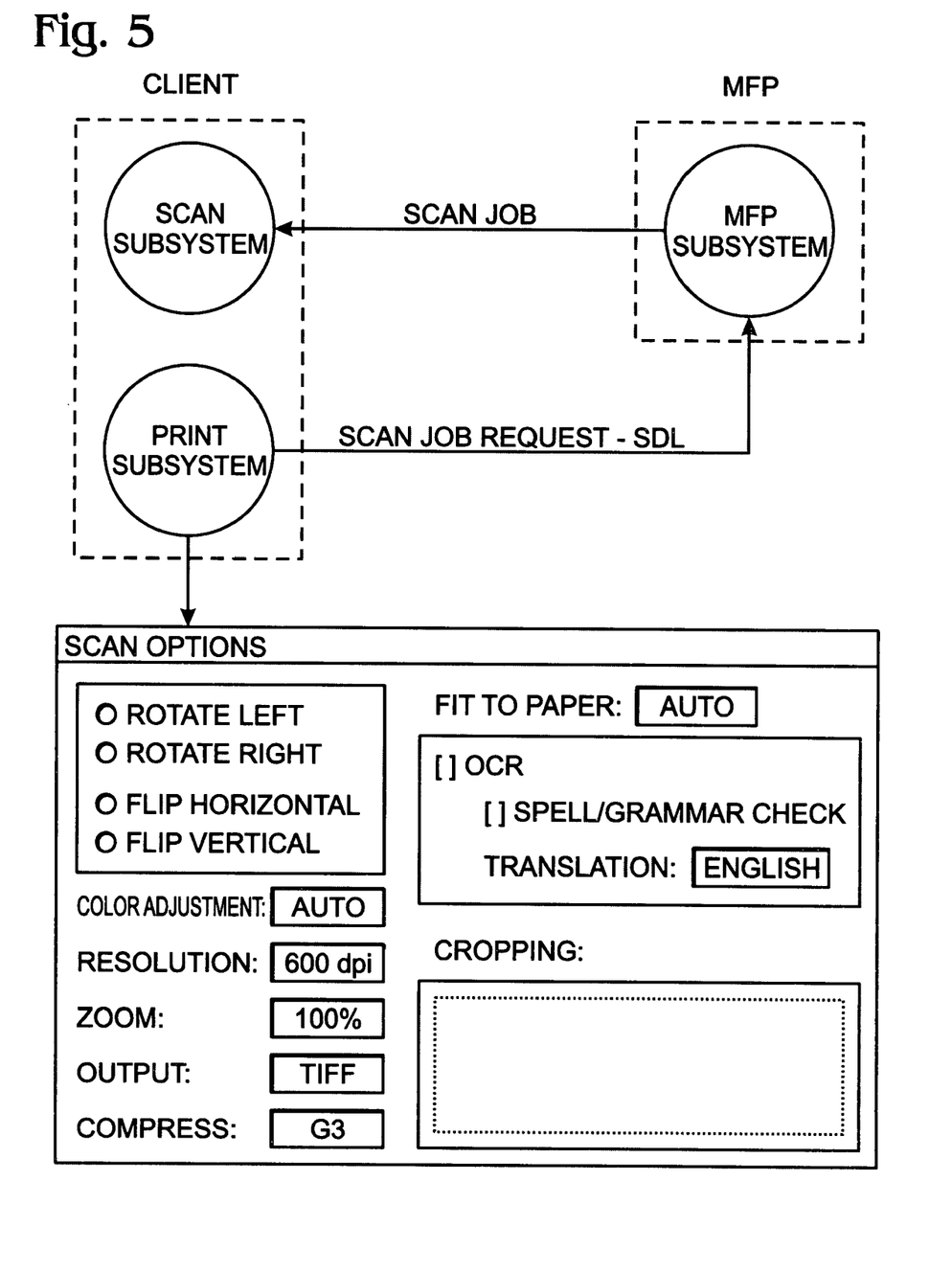
FIG. 5 illustrates an exemplary user interface that might be used with the system of FIG. 4.

FIG. 5 illustrates an exemplary user interface that might be used with the system of FIG. 4. In one aspect of the invention, the user initiates a network scan job from a client computing device (client). The user initiates the network scan job via any manner of means, such as, but not limited to, a network scan-enabled application, a connected web page, or a combination printer/scanner driver, referred to herein as an MFP driver. Generally, the user selects a targeted scanning device (MFP) or MFPs. The MFP may be preselected, auto-discovered, selected using a best-fit mechanism, or manually entered by the user. The user then selects various scan options, which may include, but are not limited to: resolution (i.e., dpi), cropping, destination, output format, or compression method.

Likewise, image manipulations options may be selected such as: rotation, negative, mirror image, zoom, fit-to-size, or color adjustment. Further, segmentation options may be selected such as: OCR, font replacement, filtering, language translation, or vector/bitmap enhancements.

The user initiates the scan, typically by selecting an OK button. The scan subsystem on the client computing device, using the MFP driver for example, constructs a scan job as a sequence of commands from the scan description language (SDL). An exemplary set of SDL commands follows:

```
UEL
    @SDL SET DESTINATION=<client>
    @SDL SET IPADDRESS=<client ip address>
    @SDL SET CONFIRMATION=YES
    @SDL SET RESOLUTION=600
    @SDL SET FORMAT=TIFF
    @SDL SET COMPRESSION=G3
    @SDL SET ROTATION=LEFT
    @SDL SET ZOOM=100%
    @SDL SET SCAN               // scan image one
    @SDL SET ZOOM=25%
    @SDL SET RESOLUTION=75
    @SDL SET THUMBNAIL          // thumbnail of image one
    @SDL SET ZOOM=100%
    @SDL SET RESOLUTION=600
    @SDL SET OCR=SPELL
UEL
```

In the above example, SDL commands are constructed to scan two images and produce a third image that is a thumbnail of the first image. The second image is additionally processed for OCR (word segmentation) and spell corrected.

Once the user initiates the network scan, the SDL commands are transmitted from the client computing device to the MFP. The SDL commands may be transmitted directly to the MFP or via a 3$^{rd}$ party, such as a server computing device. The method of transmission may be the print subsystem or some other known or proprietary method.

The actual scan itself may be interactive or automatic. In interactive scanning, the scan request appears in a scan request queue as an unprocessed scan job. Generally, the scan request queue is accessible from the front panel of the MFP. The scan request queue may reside on the MFP, a server device, or pulled from the client computing device, as examples. The user selects the specific scan job from the scan request queue and the MFP proceeds with scanning the document(s). Once completed, the scan request is deleted from the queue. A completed document may mean that the document(s) was successfully scanned, and/or successfully transmitted to the destination, and/or confirmation of receipt, and/or all SDL statements in the scan job were fully processed.

In automatic scanning, the document(s) are presumed to be preloaded on the scanning device. The MFP automatically proceeds with scanning the documents.

The SDL data may be partitioned (partial performed or executed) between different scan subsystems. For example, part of the SDL data may be executed on the scan device subsystem prior to despooling the SDL data to the MFP. For example, accounting information may be processed. These performed actions are deleted from the SDL commands and any appropriate substitutions inserted back into the SDL commands as a result of the execution. The modified SDL data is then be sent to the MFP. The MFP may then execute another part of the SDL commands, such as the physical scan, cropping, image resolution and transmission. These actions are deleted from the SDL commands, and any appropriate substitutions, such as scanned image data, are inserted back into the scan job as a result of the execution. The modified data can be sent, either pushed or pulled, back to the scan subsystem of the client computing device. The scan subsystem of the client computing device can then execute any of the remaining SDL statements, such as pulling the scanned image data, OCR, spell correction, language translation, or color adjustment.

Scan Job Initiated at MFP

Figure 6:
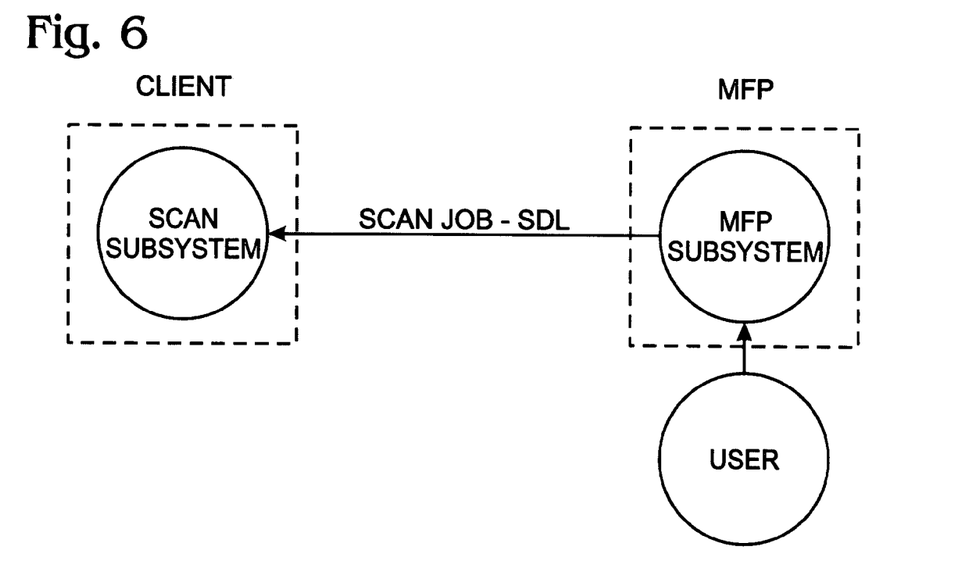
FIG. 6 illustrates a scan job constructed at a scanning device front panel.

FIG. 6 illustrates a scan job constructed at a scanning device front panel.

Figure 7:
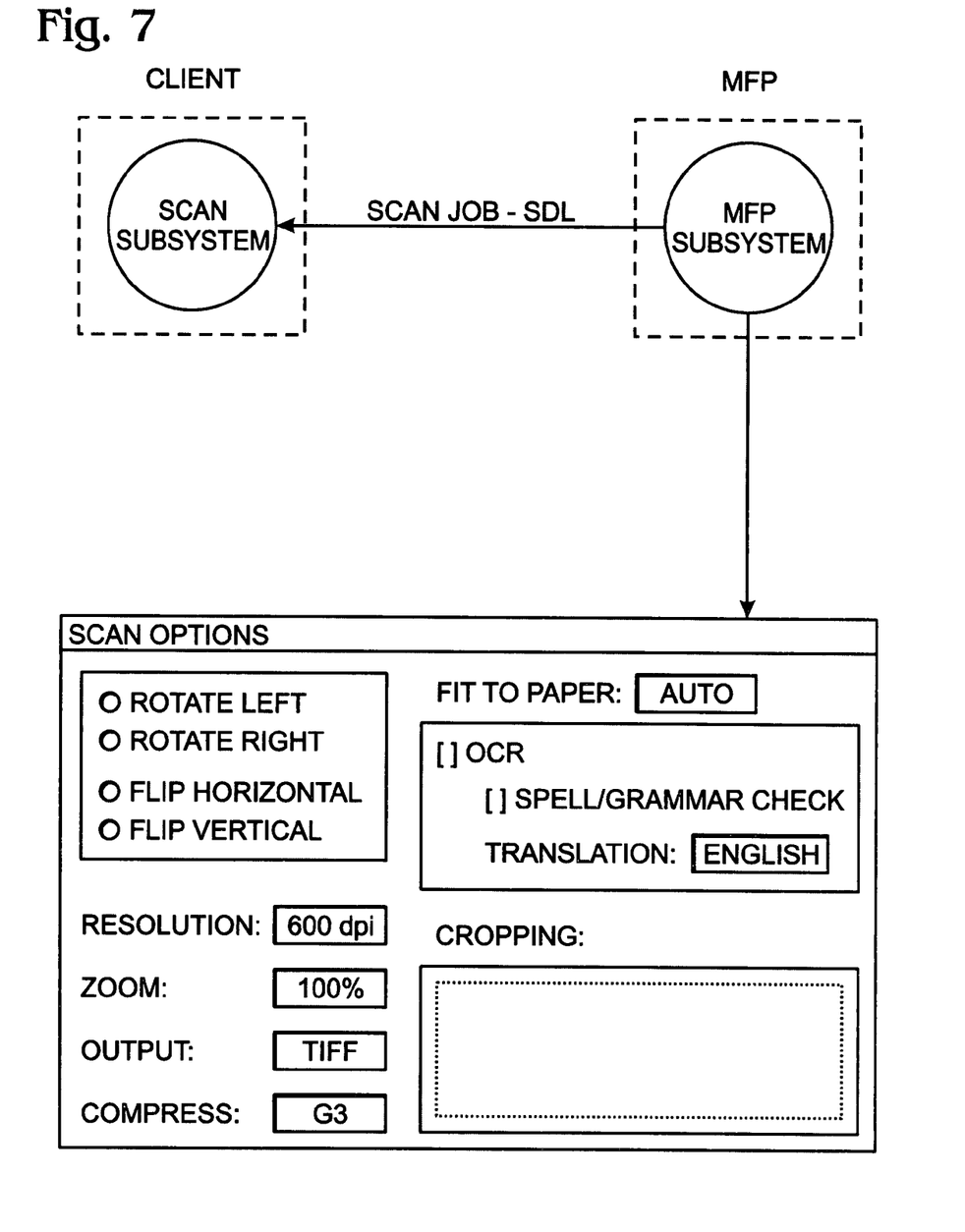
FIG. 7 illustrates an exemplary user interface that may be used with the system of FIG. 6.

FIG. 7 illustrates an exemplary user interface that may be used with the system of FIG. 6. In another aspect of the invention, the user initiates a network scan job from the scanning device (MFP) front panel. Generally, the user selects a targeted destination or destinations, which may include, but is not limited to: a client computing device, an email address, a fax number, a FTP server, or an instant messenger (IM) user. The destination may be selected by any manner of means, including, but not limited to: preselected, auto-discovered, or manually entered.

The user may select various scan options, such as the above-noted options. The user then initiates the scan, typically by selecting an OK button. The firmware on the MFP constructs a scan job as a sequence of commands from a SDL. Examples of SDL commands have been provided above.

Once initiated, the MFP interprets the SDL and executes all, or part of the SDL statements. The executed actions are deleted from the SDL scan job and the appropriate substitutions made, as described earlier. The modified scan job is then transmitted to a destination(s), either pushed or pulled.

The scan subsystem at the destination, for example a client computing device, then executes any of the remaining SDL statements, such as pulling the scanned image data, OCR, spell correction, language translation, or color adjustment.

Figure 8:
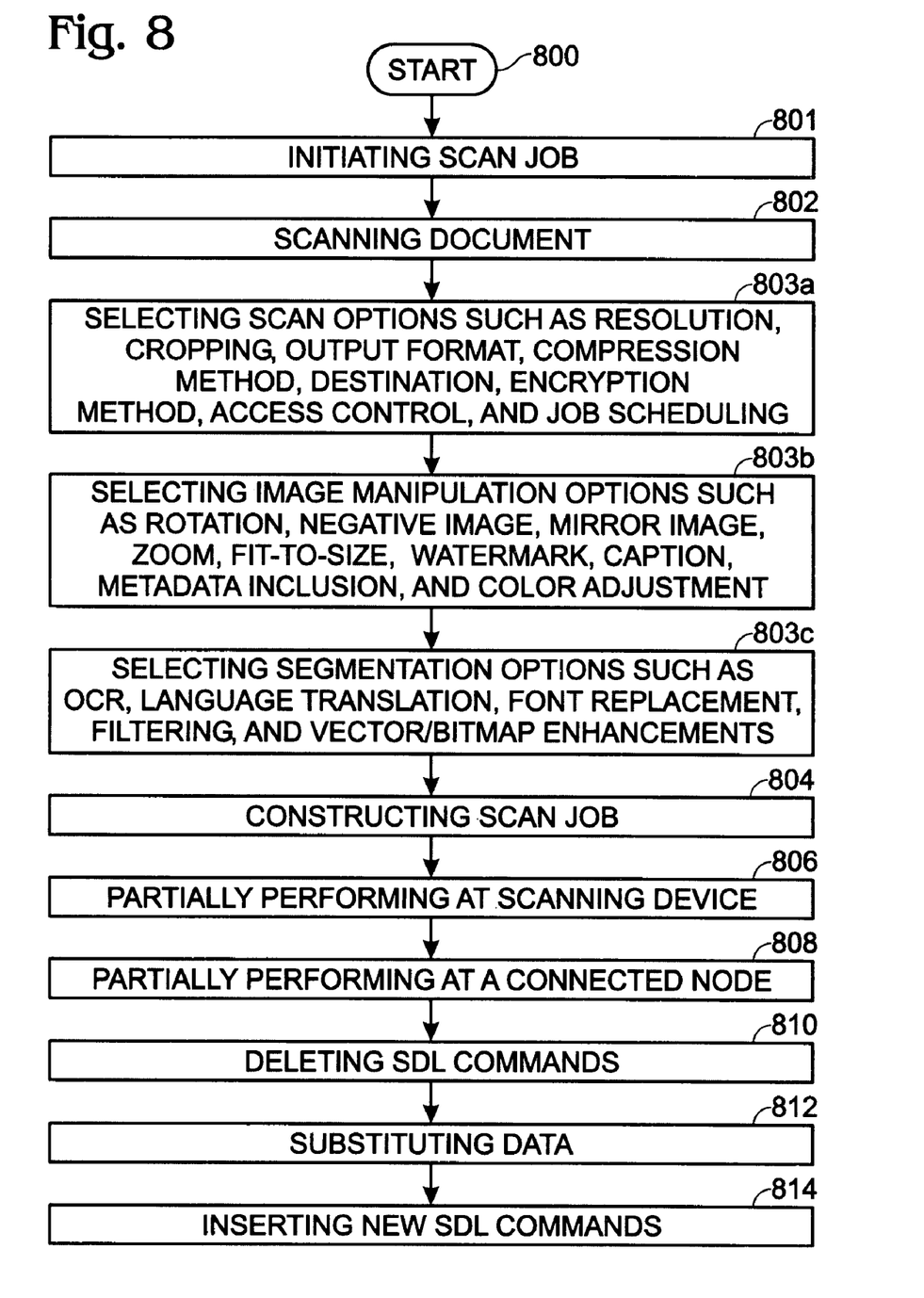
FIG. 8 is a flowchart illustrating the present invention scan description language (SDL) method for managing a scan job in a network including a scanning device.

FIG. 8 is a flowchart illustrating the present invention scan description language (SDL) method for managing a scan job in a network including a scanning device. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 scans a document at a scanning device. Step 804 constructs a scan job using SDL commands. Step 806 partially performs the scan job at the scanning device in response to the SDL commands. Step 808 partially performs the scan job at a node connected to the scanning device in response to the SDL commands.

Constructing a scan job using SDL commands in Step 804 includes constructing the scan job at a node such as a scanning device front panel, a connected web page, or a client connected to the scanning device. In some aspects a further step, Step 801, initiates the scan job from a node such as the front panel of the scanning device, a connected client, or a connected web page. It should be noted that a scan job may be initiated either before of after a document is scanned (Step 802), and either before or after a scan job is constructed (Step 804). Likewise, it should be noted that the document may be scanned (Step 802) either before or after the scan job is constructed (Step 804).

In some aspects, partially performing the scan job in Step 808 includes partially performing the scan job at a node such as a locally connected client, a network-connected client, a network-connected server, a locally connected server, another scanning device, or a telephone network-connected client.

Other aspects of the method include additional steps. Step 803*a* selects scan options chosen from the group including resolution (dpi), cropping, output format, destination, compression method, encryption method, access control, and job scheduling. Then, constructing a scan job using SDL commands in Step 804 includes forming SDL commands to perform the selected scan options.

Step 803*b* selects image manipulation options chosen from the group including rotation, negative image, mirror image, zoom, fit-to-size, watermark, caption, metadata inclusion, and color adjustment. Then, Step 804 includes forming SDL commands to perform the selected image manipulation options.

Step 803*c* selects segmentation options chosen from the group including optical character recognition (OCR), font replacement, language translation, filtering, and vector/bitmap enhancements. Then, Step 804 forms SDL commands to perform the selected segmentation options.

In one aspect, Step 806 includes initially performing a part of the scan job task at the scanning device, and Step 808 subsequently performs a part of the scan job task at a node scan subsystem.

Alternately, Step 808 includes initially performing a part of the scan job task at a node scan subsystem, prior to despooling the scan job, and Step 806 includes subsequently performing a part of the scan job task at the scanning device. That is, Step 808 is performed before Step 806. Further, Step 808 may include finishing the scan job task at a node scan subsystem, subsequent to partially performing scan job tasks at the scanning device. That is, the order of the steps is: Step 808, Step 806, and Step 808 (performing different SDL commands).

Other aspects of the method include additional steps. Step 810 deletes SDL commands from the scan job associated with a particular task, after the task is performed. Step 810 may be performed after Step 806 and/or after Step 808. In some aspects, constructing a scan job using SDL commands in Step 804 includes constructing a scan job including SDL commands and scanned document data. Then, Step 812 substitutes scanned document data in the scan job, following the completion of a scan job SDL command. Step 812 may be performed after either Step 806 or Step 808. Alternately, Step 812 substitutes a link (e.g., http link) to the scanned document data that is spooled to a storage location. In another aspect, Step 814 inserts new SDL commands in the scan job, following the completion of a scan job SDL command. Again, Step 814 may be performed after either Step 806 or Step 808.

To emphasize the fact the present invention process of partitioning SDL commands is responsive to a single scan job it should be noted that in some aspects Step 804 constructs a first scan job. Step 806 partially performs the scan job in response to the first scan job SDL commands. Likewise, Step 808 partially performs the scan job in response to the first scan job SDL commands.

A system and method have been provided for the management of a scan job using SDL commands. Examples have been given of the invention in different network environments, but the invention is not limited to any particular kind of scanning device connections. Specific communications have also been described for delivering the scan jobs. Again, the invention is not limited to these examples.

Although the invention has generally been explained in the context of a Microsoft Windows operating system, the invention can also be practiced with the scan, spooling, and despooling subsystems of an APPLE® MacIntosh Operating System, Linux Operating System, System V Unix Operating Systems, BSD Unix Operating Systems, OSF Unix Operating Systems, Sun Solaris Operating Systems, HP/UX Operating Systems, or IBM® Mainframe MVS and AS/400 Operating System, to name a limited list of other possibilities. Other variations and embodiments of the invention will occur to those skilled in the art.

I claim:

1. In a network including a scanning device, a scan description language (SDL) method for managing a scan job, the method comprising:

scanning a document at the scanning device;

selecting segmentation options chosen from a group including optical character recognition (OCR), font replacement, language translation, filtering, and vector/bitmap enhancements;

constructing a first scan job using SDL commands;

submitting the first scan job at the initiation of the job;

partially performing the first scan job at the scanning device in response to the SDL commands;

partially performing the first scan job at a node connected to the scanning device in response to the SDL commands; and, wherein constructing the first scan job using SDL commands includes-forming SDL commands to perform the selected segmentation options.

2. The method of claim 1 wherein constructing the first scan job using SDL commands includes constructing the scan job at the node selected from a group consisting of a scanning device front panel, a connected web page, and a client connected to the scanning device.

3. The method of claim 2 wherein submitting the first scan job at the initiation of the job includes initiating the first scan job from the node selected from a group consisting of a front panel of the scanning device, a connected client, and a connected web page.

4. The method of claim 1 wherein partially performing the first scan job at the node connected to the scanning device includes partially performing the scan job at the node selected from a group consisting of a locally connected client, a network-connected client, a network-connected server, a locally connected server, another scanning device, and a telephone network-connected client.

5. The method of claim 1 further comprising:

selecting scan options chosen from a group consisting of resolution (dpi), cropping, output format, destination, compression method, encryption method, access control, and job scheduling; and, wherein constructing the first scan job using SDL commands includes forming SDL commands to perform the selected scan options.

6. The method of claim 1 further comprising:

selecting image manipulation options chosen from a group consisting of rotation, negative image, mirror image, zoom, fit-to-size, watermark, caption, metadata inclusion, and color adjustment; and, wherein constructing the first scan job using SDL commands includes forming SDL commands to perform the selected image manipulation options.

7. The method of claim 1 wherein partially performing the first scan job at the scanning device includes initially performing a first part of the scan job task at the scanning device; and, wherein partially performing the first scan job at the node connected to the scanning device includes subsequently performing a second part of the scan job task at the node scan subsystem.

8. The method of claim 1 wherein partially performing the first scan job at the node connected to the scanning device includes initially performing a first part of the scan job task at a scan subsystem of the node prior to despooling the scan job; and, wherein partially performing the first scan job at the scanning device includes subsequently performing a second part of the scan job task at the scanning device.

9. The method of claim 8 wherein partially performing the first scan job at the node connected to the scanning device includes finishing the scan job task at the node scan subsystem, subsequent to performing the second part of the scan job at the scanning device.

10. The method of claim 1 further comprising:
deleting SDL commands from the first scan job associated with a particular task, after the task is performed.

11. The method of claim 10 wherein constructing the first scan job using SDL commands includes constructing the first scan job including SDL commands and scanned document data; and,
the method further comprising:
substituting scanned document data in the first scan job, following the completion of a scan job SDL command.

12. The method of claim 10 farther comprising:
inserting new SDL commands into the first scan job, following the completion of the SDL commands.

13. In a network including a scanning device, a scan description language (SDL) system for managing scan jobs, the system comprising:
the scanning device including a first scan subsystem having an interface to accept a first scan job constructed using a scan description language (SDL) commands, to accept a scanned document, and to supply at least a partially processed first scan job in response to the SDL commands;
a first node connected to the scanning device including a second scan subsystem having an interface for accepting the SDL constructed first scan job and an interface to supply the first scan job further processed in response to the SDL commands; and,
wherein the first node is a device selected from a group consisting of a locally connected client, a network-connected client, a network-connected server, a locally connected server, another scanning device, and a telephone network-connected client.

14. The system of claim 13 further comprising:
a second node including a language assembler having an interface for supplying the scan job SDL commands; and,
wherein the second node is a device selected from a group consisting of a front panel of the scanning device, a connected web page, and a client connected to the scanning device.

15. The system of claim 14 wherein the second node language assembler has a user interface (UI) for selecting scan options chosen from a group consisting of resolution (dpi), cropping, output format, destination, compression method, encryption method, access control, and job scheduling, the second node supplying scan job SDL commands to perform the selected scan options.

16. The system of claim 14 wherein the second node language assembler has a UI for selecting image manipulation options chosen from a group consisting of rotation, negative image, mirror image, zoom, fit-to-size, watermark, caption, metadata inclusion, and color adjustment, the second node supplying scan job SDL commands to perform the selected image manipulation options.

17. The system of claim 14 wherein the second node language assembler has a UI for selecting segmentation options chosen from a group consisting of optical character recognition (OCR), font replacement, language translation, filtering, and vector/bitmap enhancements, the second node supplying scan job SDL commands to perform the selected segmentation options.

18. The system of claim 13 further comprising:
a third node having an interface for initiating the first scan job processing; and,
wherein the third node is a device selected from a group consisting of a front panel of the scanning device, a connected client, and a connected web page.

19. The system of claim 13 further comprising:
a fourth node having a scan unit with an interface to receive a document and an interface to supply the scanned document; and,
wherein the fourth node is a device selected from a group consisting of the scanning device, another scanning device connected to the scanning device, and a fax machine.

20. The system of claim 13 wherein the scanning device first scan subsystem initially performs a first part of the first scan job task; and,
wherein the first node second scan subsystem subsequently performs a second part of the first scan job task.

21. The system of claim 13 wherein the first node second scan subsystem initially performs a first part of the first scan job task, prior to despooling the scan job; and,
wherein the scanning device first scan subsystem subsequently performs a second part of the first scan job task.

22. The system of claim 21 wherein the first node second scan subsystem finishes the second part of the first scan job tasks, subsequent to the partially performing of the first part of the first scan job tasks at the scanning device first scan subsystem 23. The system of claim 13 wherein the scan subsystems delete SDL commands from the first scan job associated with a particular task, after the task is performed.

24. The system of claim 23 wherein the scan subsystems accept the first scan job with scanned document data and substitute scanned document data in the first scan job, following the completion of the SDL command.

25. The system of claim 23 wherein the scan subsystems insert new SDL commands in the first scan job, following the completion of the scan job SDL command.

26. The system of claim 23 wherein the second node language assembler constructs the first scan job and submits the first scan job at the initiation of the scan job.

27. In a network including a scanning device, a method for using a s can description language (SDL) to manage the processing of a scan job, the method comprising:
scanning a document at the scanning device;
constructing a first scan job using SDL commands;
partially performing the first scan job at the scanning device in response to the SDL commands; and, partially performing the first scan job at a node connected to the scanning device in response to the SDL commands, where the node is selected from a group consisting of a locally connected client, a network-connected client, a network-connected server, a locally connected server, another scanning device, and a telephone network-connected client.

28. In a network including a scanning device, a scanning device system for using a scan description language (SDL) system to manage scan jobs, the system comprising:

the scanning device including a first scan subsystem having an interface to accept a first scan job constructed using a scan description language (SDL) commands, to accept a scanned document, and to supply at least a partially processed first scan job in response to the SDL commands;

a first node connected to the scanning device including a second scan subsystem having an interface for accepting the SDL constructed first scan job and an interface to supply the at least partially processed first scan job in response to the SDL commands; and, wherein the scan subsystems delete SDL commands from the first scan job associated with a particular task, after the task is performed.

* * * * *